(12) United States Patent
Park et al.

(10) Patent No.: US 6,912,900 B1
(45) Date of Patent: Jul. 5, 2005

(54) MUSCULAR MOTION SIMULATING SYSTEM

(75) Inventors: In-Hwang Park, Seoul (KR); In-Bae Chang, Seoul (KR); Dong-Chul Han, Seoul (KR)

(73) Assignee: Seoul National University Industry Foundation, (KR)

( * ) Notice: Subject to any disclaimer, the term of this patent is extended or adjusted under 35 U.S.C. 154(b) by 0 days.

(21) Appl. No.: 10/903,361

(22) Filed: Jul. 30, 2004

(51) Int. Cl.$^7$ ................................................. A61B 5/22
(52) U.S. Cl. ..................................... 73/397.01; 482/4
(58) Field of Search ..................... 73/379.01, 379.02, 73/379.03, 862.041; 482/4; 446/183

(56) References Cited

U.S. PATENT DOCUMENTS

| | | | | |
|---|---|---|---|---|
| 5,340,348 A | * | 8/1994 | Schroeder | 446/73 |
| 5,419,729 A | * | 5/1995 | Gross | 446/183 |
| 5,577,981 A | * | 11/1996 | Jarvik | 482/4 |
| 5,929,844 A | * | 7/1999 | Barnes | 345/156 |
| 6,267,737 B1 | * | 7/2001 | Meilus | 601/108 |

* cited by examiner

*Primary Examiner*—Edward Lefkowitz
*Assistant Examiner*—Jewel Thompson
(74) *Attorney, Agent, or Firm*—Cantor Colburn LLP (57) ABSTRACT

Disclosed herein is a muscular motion simulating system that is capable of simulating a force-displacement characteristic of an ideal muscle model through the use of a large displacement magnetic actuating unit supported by means of linear springs. The muscular motion simulating system comprises a base plate mounted to a virtual muscle part in a dummy in the longitudinal direction thereof, a moving body connected to a wire withdrawn from the virtual muscle part such that the moving body can be slid on the base plate when the position of the wire is changed due to an external impact so as to output the moved distance of the moving body, a load cell connected to the lower part of the moving body for measuring a load depending upon the moved distance of the moving body, a fixing plate fixed to the lower end of the base plate while being protruded outwardly, a load-adjusting unit disposed between the load cell and the fixing plate for outputting positional information to increase or decrease the load applied to the load cell by means of a biasing force of the magnetic field, and a control unit for controlling the actuation of the load-adjusting unit such that load applied to the load cell corresponds to the muscle strength according to the moved distance of the moving body with reference to the positional information inputted from the load-adjusting unit.

9 Claims, 7 Drawing Sheets

MUSCULAR MOTION SIMULATING SYSTEM

BACKGROUND OF THE INVENTION

1. Field of the Invention

The present invention relates to a muscular motion simulating system, and more particularly to a muscular motion simulating system that is capable of simulating a force-displacement characteristic of an ideal muscle model through the use of a large displacement magnetic actuating unit supported by means of linear springs.

2. Description of the Related Art

Various tests, such as a dummy test, a cadaver test, a volunteer test, and a virtual human model test using finite element analysis, are carried out to evaluate how much a human body is injured when a collision occurs.

It is reported that the muscles of the human body respond to a collision while the collision occurs, and the response of the muscle has an effect on the behavior of the human body. Consequently, it is necessary to carry out a test for examining the muscle response of the human body while the collision occurs.

However, it is very difficult to acquire response characteristics of the muscles of the human body on the basis of the cadaver test or the volunteer test, which is usually used for a collision test.

Specifically, the muscle is not actively moved by means of the cadaver test with the result that the behavior of the human body cannot be accurately acquired through the collision test. The volunteer test is carried out at low speed so that the human body is not injured during the test. Since the volunteer test is carried out at low speed as described above, a viscoelastic characteristic of the human tissue may be changed in the section where the human body is injured.

The virtual human model test using finite element analysis is very effective to analytically express the behavior of the human body. However, the results obtained through the use of the virtual human model test may be different from the real behavior of the human body if a restriction condition of the human tissue or a characteristic of the human tissue is not accurately understood.

Consequently, it is required to develop a new muscle model and a muscle simulating system for verifying such a muscle model.

SUMMARY OF THE INVENTION

Therefore, the present invention has been made in view of the above problems, and it is an object of the present invention to provide a muscular motion simulating system that is capable of adjusting a load generated when a collision occurs such that it corresponds to the muscle strength of a human body equivalent to the extensional displacement of the muscle, thereby simulating a force-displacement characteristic of a Hill muscle model.

It is another object of the present invention to provide a muscular motion simulating system that is capable of simulating a characteristic of the muscle having large displacement by using a magnetic actuating unit having relatively small displacement to extension of the muscle.

In accordance with the present invention, the above and other objects can be accomplished by the provision of a muscular motion simulating system, comprising: a base plate mounted to a virtual muscle part in a dummy in the longitudinal direction thereof; a moving body connected to a wire withdrawn from the virtual muscle part such that the moving body can be slid on the base plate when the position of the wire is changed due to an external impact so as to output the moved distance of the moving body; a load cell connected to the lower part of the moving body for measuring a load depending upon the moved distance of the moving body; a fixing plate fixed to the lower end of the base plate while being protruded outwardly; a load-adjusting unit disposed between the load cell and the fixing plate for outputting positional information to increase or decrease the load applied to the load cell by means of a biasing force of the magnetic field; and a control unit for controlling the actuation of the load-adjusting unit such that load applied to the load cell corresponds to the muscle strength according to the moved distance of the moving body with reference to the positional information inputted from the load-adjusting unit.

In a preferred embodiment of the present invention, the muscular motion simulating system adjusts the load applied to the load cell through the use of the load-adjusting unit when a collision occurs such that the load applied to the load cell corresponds to the muscle strength equivalent to the extensional displacement of a virtual muscle part, thereby safely and accurately simulating a force-displacement characteristic of a Hill muscle model.

With the muscular motion simulating system of the present invention, concrete understanding about possible injuries of an experimental model when a collision occurs is possible without the limit of experimental models, such as a dummy, a cadaver, or a volunteer. Also, the muscular motion simulating system of the present invention may be adopted to simulate a characteristic of the muscle of a human cervical vertebra model, which is used to evaluate how much the cervical vertebra is injured.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings. Those skilled in the art will easily understand and reproduce the present invention through the following detailed description of the embodiment.

Figure 1:
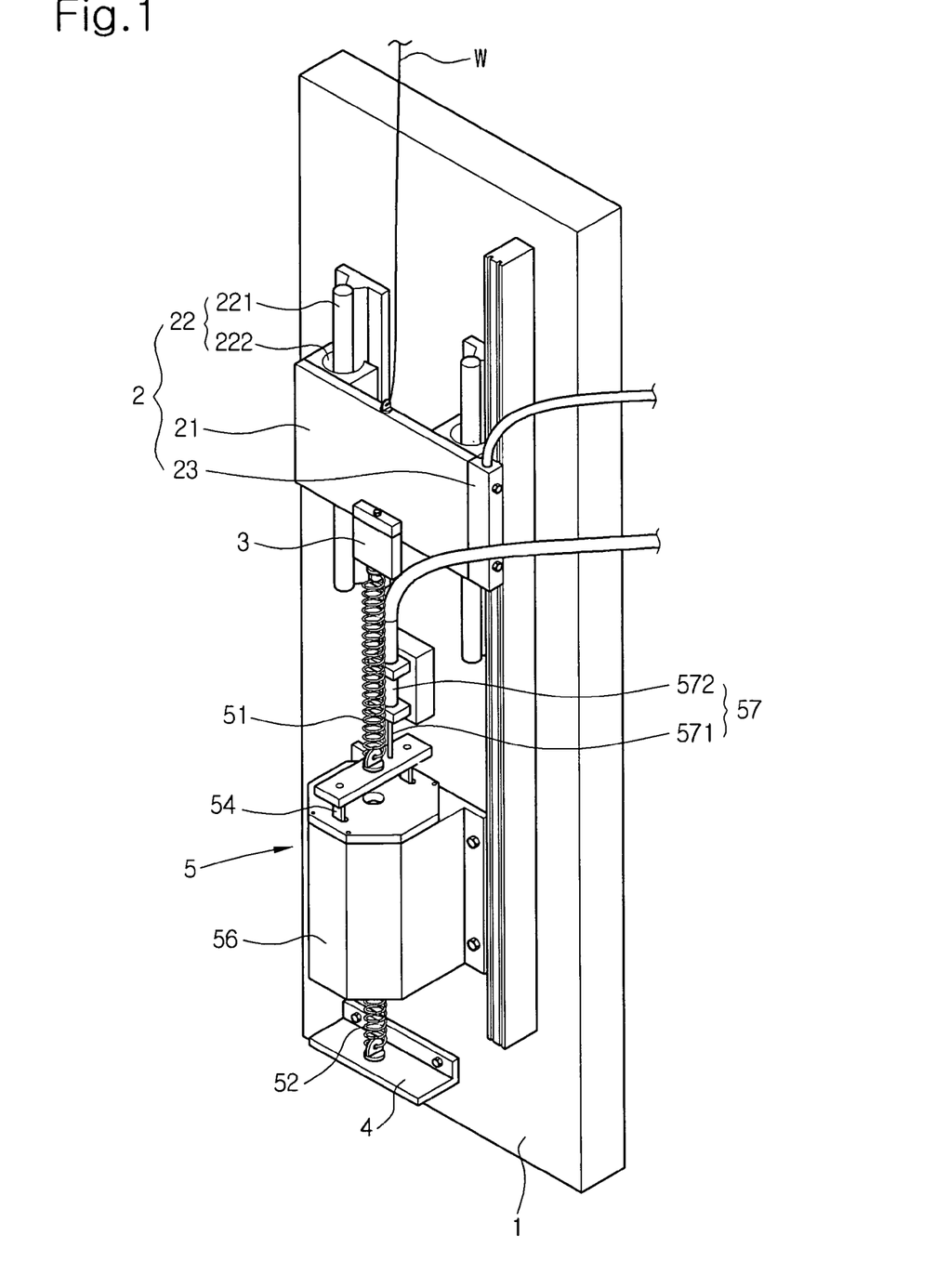
FIG. 1 is a perspective view showing the structure of a muscular motion simulating system according to a preferred embodiment of the present invention.

FIG. 1 is a perspective view showing the structure of a muscular motion simulating system according to a preferred embodiment of the present invention.

Before the structure of the muscular motion simulating system according to the present invention is described below, a definition of the muscular motion simulating system will be given. The muscular motion simulating system suggested in the present invention is a system that is capable of enabling a dummy or a cadaver, which is used to test safety of a vehicle, to simulate a force-displacement characteristic exhibited by a Hill muscle model, which is known to be most approximate to a human muscle model, for example, characteristics of an active force, an inactive force, and a hybrid force, which is the sum of the active force and the inactive force, of a muscle to displacement.

When an external impact is applied to the muscle, an impact force (hereinafter referred to as "load") is transmitted to the muscle, and an extensional displacement of the muscle is generated on the basis of the impact force. The muscular motion simulating system according to the present invention increases or decreases the load of the muscle to adjust the load of the muscle such that the load of the muscle corresponds to the muscle strength of a human body through the use of the load transmitted to the muscle and the extensional displacement of the muscle based on the impact force. As shown in FIG. 1, the muscular motion simulating system according to the present invention comprises a base plate 1, a moving body 2, a load cell 3, a fixing plate 4, a load-adjusting unit 5, and a control unit (not shown) for controlling the whole system.

The base plate 1 is mounted to a virtual muscle part in a dummy, such as a muscle part of the cervical vertebra, the vertebral column, or the lumbar vertebra, or a muscle part of the arm or the leg, in the longitudinal direction thereof. In the embodiment of the present invention, the virtual muscle part indicates the muscle part of the cervical vertebra, by which the present invention is not limited though. For example, the base plate may be mounted to the above-mentioned other muscle parts.

The moving body 2 is connected to a wire W withdrawn from the virtual muscle part such that the moving body 2 can be slid on the base plate 1 when the position of the wire W is changed due to an external impact so as to output the moved distance of the moving body. The moving body 2 includes a motion table 21 connected to the wire W, and a motional displacement-measuring unit 23 for measuring the motional displacement of the motion table 21 on the basis of the positional change of the wire W.

The motion table 21 is connected to the end of the wire, and is slid by means of a guide unit 22 fixed to both sides of the upper part of the base plate 1 when the position of the wire is changed. The guide unit 22 for guiding the sliding movement of the motion table 1 comprises guide shafts 221 fixed to both sides of the base plate 1 while extending in the longitudinal direction of the base plate 1, respectively, and guide grooves 222 formed at both sides of the rear part of the motion table 21 such that the guide shafts 221 are slidably inserted in the guide grooves, respectively.

The motional displacement-measuring unit 23 is fixed to one side of the motion table 21 for measuring how far the motion table is moved by means of the wire W.

In the embodiment of the present invention, a linear displacement-measuring unit is used to detect how far the motion table is moved due to the positional change of the wire. This linear displacement-measuring unit is well known prior to the filing date of the present application, and thus a detailed description of the linear displacement-measuring unit will not be given.

According to the present invention, the motion table 21 is slid vertically while a load is applied to the motion table 21 by means of the guide means 22 comprising the guide shafts 221 and guide grooves 222 when an external impact is applied to the motion table 21. At this time, the motional displacement-measuring unit 23 of the moving body 2, which is fixed to one side of the motion table 21, detects how far the motion table 21 is moved on the basis of the positional change of the wire, and the detected value is outputted to the control unit.

The motional displacement of the motion table outputted to the control unit indicates the positional displacement of the wire withdrawn from the virtual muscle part due to an external impact, i.e., how far the wire is moved due to the external impact. The extensional displacement of the muscle due to the impact can be obtained through the detection of the positional displacement of the wire.

The load of the wire caused due to the external impact is measured by means of the load cell 3, which is fixed to the lower part of the moving body 2, specifically to the center of the lower end of the motion table 21 of the moving body 2. The load cell is well known prior to the filing date of the present application, and thus a detailed description of the load cell will not be given.

Consequently, the muscular motion simulating system of the present invention measures the load applied to the muscle by means of the load cell when an external impact is primarily applied to the muscle. The measured load is used as a very important factor for simulating the force-displacement characteristic of a Hill muscle model, which will be described in detail below in connection with the following description of the control unit.

The load-adjusting unit 5 adjusts the load of the load cell on the basis of the positional displacement of the wire such that the load of the load cell corresponds to the muscle strength of a human body. Specifically, the load-adjusting unit 5 is disposed between the load cell 3 and the fixing plate 4 fixed to the lower end of the base plate 1 while being protruded outwardly for outputting positional information to increase or decrease the load applied to the load cell 3 by means of a biasing force of the magnetic field. The positional information indicates current positional information of a non-magnetic moving tube constituting an electromagnet actuating part, which will be described below. The positional information will be described below in connection with the displacement-measuring unit.

In the embodiment of the present invention, the load-adjusting unit 5 comprises a magnetic actuating unit 56, upper and lower springs 51 and 52 connected to the upper and lower ends of the magnetic actuating unit 56, and a displacement-measuring unit 57.

Figure 2A:
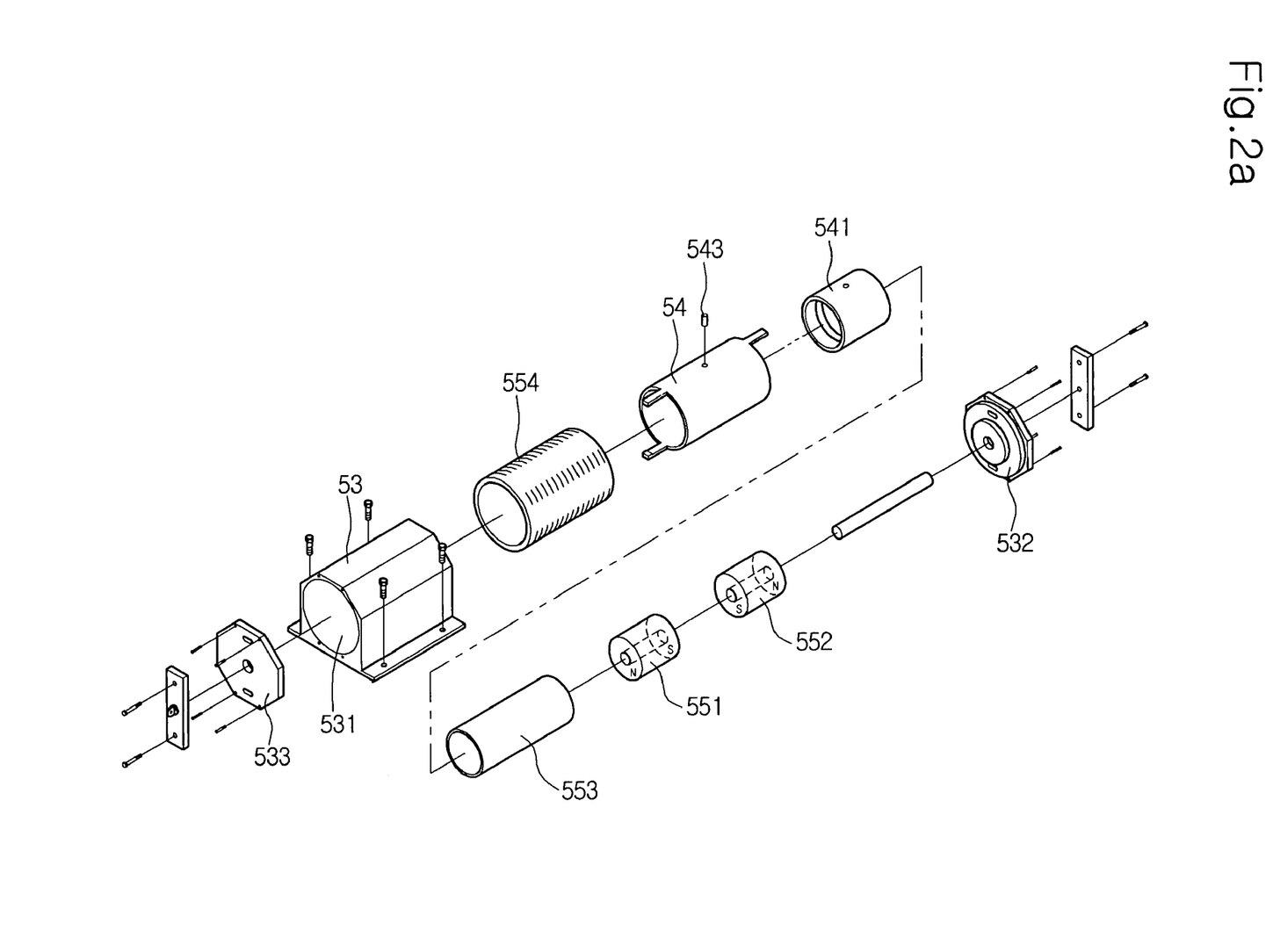
FIG. 2a is an exploded perspective view showing a magnetic actuating unit according to the present invention.
Figure 2B:
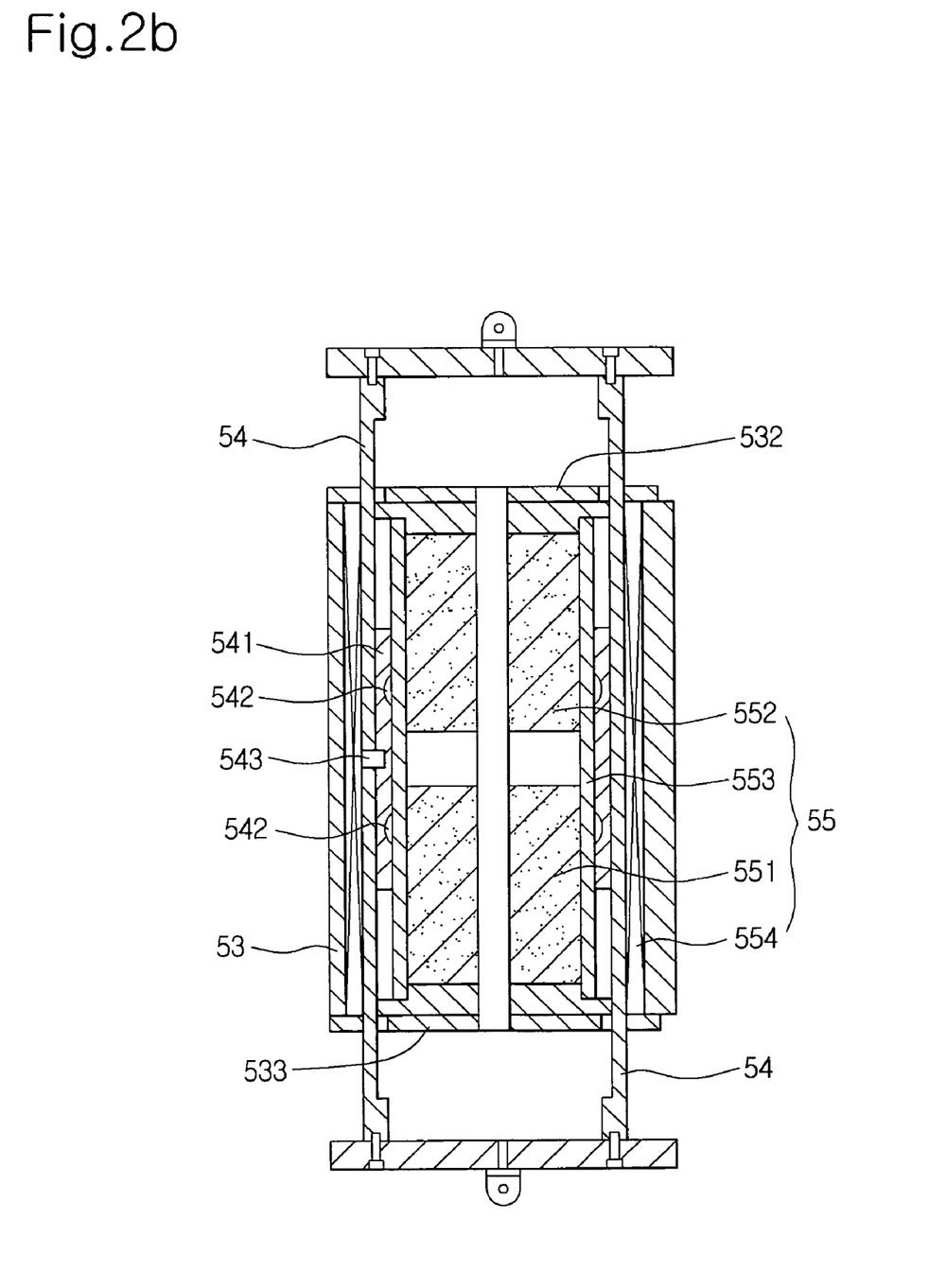
FIG. 2b is a sectional view of the magnetic actuating unit.

The magnetic actuating unit 56 extends the upper spring 51 connected to the upper end of the magnetic actuating unit 56 and contracts the lower spring 52 connected to the lower end of the magnetic actuating unit 56, or vice versa, to increase or decrease the load applied to the load cell 3. As shown in FIGS. 2a and 2b, the magnetic actuating unit 56 comprises a case 53 fixed to the base plate 1, a non-magnetic moving tube 54, and an electromagnet actuating part 55.

The case 53 has a hollow part 531 defined therein. The case 53 is fixed to the base plate 1 by means of bolts while the upper and lower ends of the hollow part 531 are closed by means of cover plates 532 and 533.

The non-magnetic moving tube 54 is inserted in the hollow part 531 of the case 53 such that the non-magnetic moving tube 54 can be moved vertically in the hollow part 531. The non-magnetic moving tube 54 is connected between the upper and lower springs 51 and 52 (Refer to FIG. 1). To the inside of the non-magnetic moving tube 54 is fixed a magnetic moving tube 541 made of a magnetic material, for example, iron, by means of a spring pin 543.

Consequently, the non-magnetic moving tube 54 is moved along with the magnetic moving tube 541 when the magnetic moving tube 541 fixed to the inside of the non-magnetic moving tube 54 is moved. As a result, the upper spring 51 is extended while the lower spring 52 is contracted, or vice versa. At this time, the magnetic moving tube 541 is moved by means of the electromagnet actuating part 55.

The electromagnet actuating part 55, which serves to actuate the magnetic moving tube 541, applies a magnetic field-biasing force to the magnetic moving tube 541 through permanent magnets 551 and 552 and an electromagnet coil 554 provided at the inside and the outside of the non-magnetic moving tube 54, respectively, so that the position of the non-magnetic moving tube 54 is changed.

The electromagnet actuating part 55 is disposed inside the magnetic moving tube 541. The electromagnet actuating part 55 comprises two permanent magnets 551 and 552 surrounded by a non-magnetic film tube 553 and spaced apart from each other due to repulsive forces between the permanent magnets 551 and 552, and an electromagnet coil 554 disposed outside the non-magnetic moving tube 54 in such a manner that the electromagnet coil 554 surrounds the non-magnetic moving tube 54 to apply a magnetic field-biasing force to the magnetic moving tube 541 by controlling the magnetic passages of the permanent magnets 551 and 552.

When a biased magnetic passage is formed at the electromagnet coil 554 according to the above-described construction, a magnetic field-biasing force is generated between the electromagnet coil 554 and the permanent magnets 551 and 552. As a result, the magnetic moving tube 541 surrounding the non-magnetic film tube 553 is moved in the direction where the biasing force is generated.

In order to prevent friction between the magnetic moving tube 541 and the non-magnetic film tube 553, the outer surface of the non-magnetic film tube 553 is preferably hardened, and a lubricant, for example, grease, is filled in two or more semi-circular grooves 542, which are formed at the inner surface of the magnetic moving tube 541 in the circumferential direction of the magnetic moving tube 541.

This is because friction between the non-magnetic film tube 553 made of a non-magnetic material, for example, aluminum, and the magnetic moving tube 541 when the magnetic moving tube 541 is moved by means of the biasing force is minimized, and thus the motional displacement of the non-magnetic moving tube 54 on the magnetic moving tube 541 is more accurately measured.

Figure 3A:
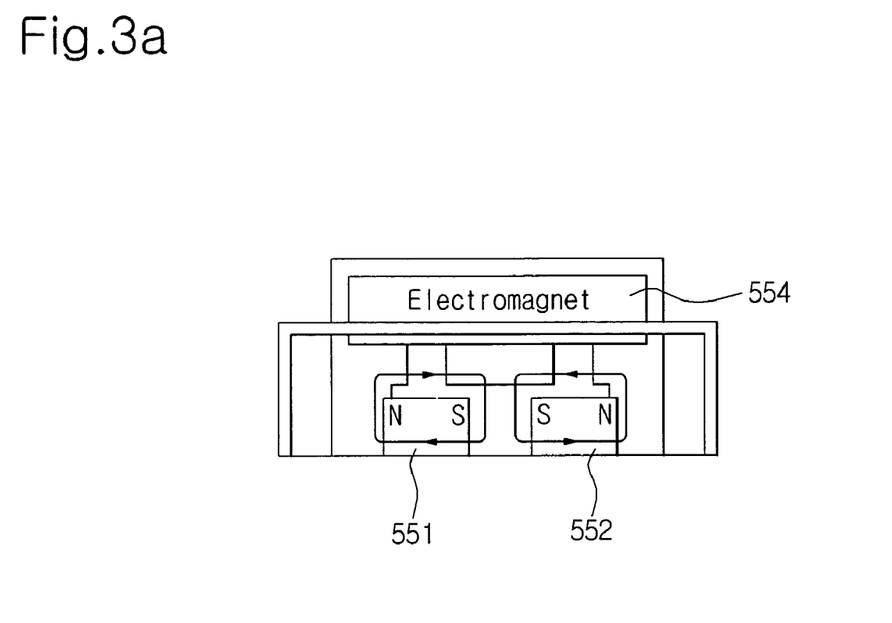
FIGS. 3a to 3c are views respectively illustrating the operation of the magnetic actuating unit of FIGS. 2a and 2b.
Figure 3B:
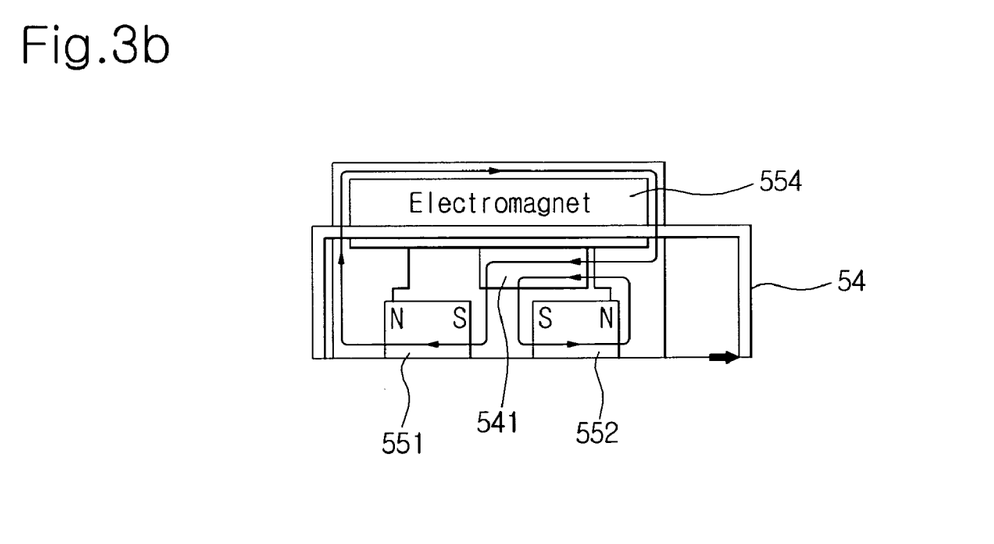
Figure 3C:
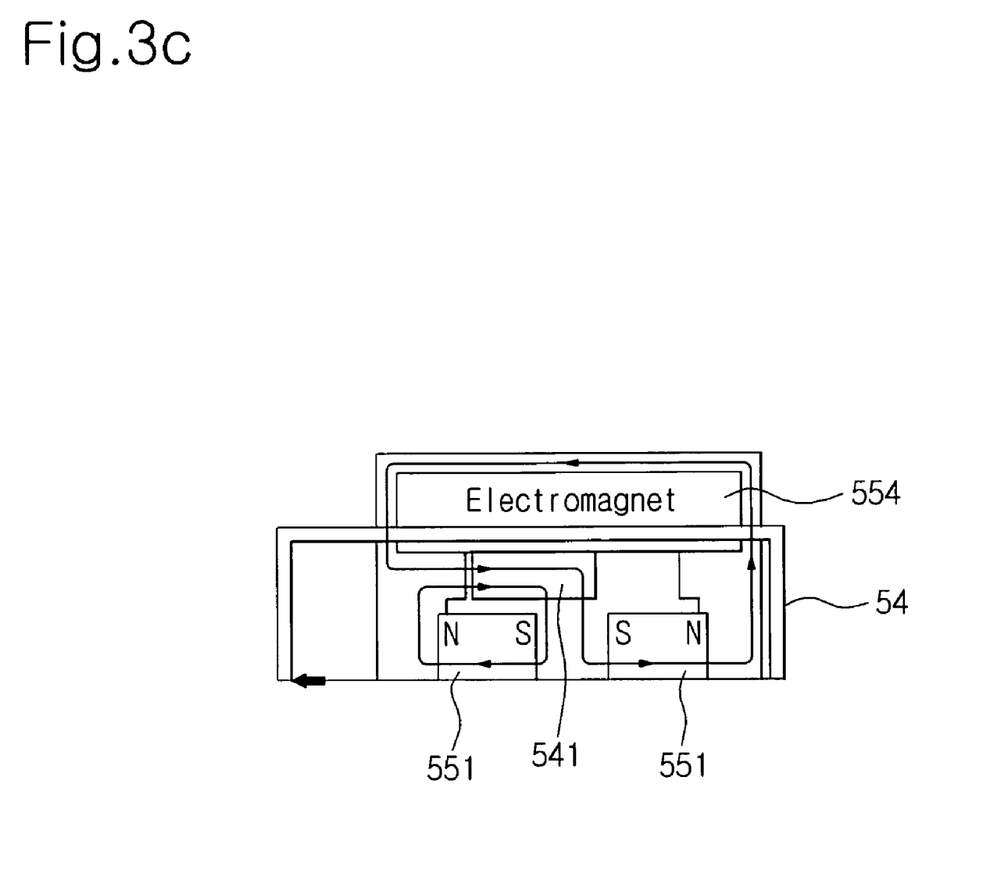

In the magnetic actuating unit 56 with the above-stated construction according to the present invention, the magnetic passages of the permanent magnets, which together form the electromagnet actuating part, are controlled by means of the magnetic passage of the electromagnet coil 554 surrounding the non-magnetic moving tube 54 as shown in FIGS. 3a to 3c.

Specifically, repulsive magnetic fields of the two permanent magnets 551 and 552 facing each other leak in the radial directions thereof, and then flow along the magnetic passages as shown in FIG. 3a. As a result, two symmetrical magnetic flux loops are formed.

When a biased magnetic passage is formed clockwise at the electromagnet coil 554 as shown in FIG. 3b, magnetic flux density of the right-side permanent magnet 552 is increased by means of the biased magnetic passage. On the other hand, the magnetic flux density of the left-side permanent magnet 551 is decreased. Consequently, the magnetic moving tube 541 is moved to the right side, and thus the non-magnetic moving tube 54, to which the magnetic moving tube 541 is fixed, is also moved to the right side.

When the biased magnetic passage is formed counterclockwise at the electromagnet coil 554 as shown in FIG. 3c, the magnetic moving tube 541 is moved to the left side. Consequently, the non-magnetic moving tube 54, to which the magnetic moving tube 541 is fixed, is also moved to the left side.

The above-described control method eliminated the necessity for the magnetic actuating unit to apply biasing current to the electromagnet, and the magnetic actuating unit may be realized through the use of a single electromagnet coil as shown in the drawings. Also, a large displacement magnetic actuating unit may be realized since the magnetic actuating unit is used in saturated magnetic flux density. Consequently, the above-described magnetic actuating unit is very suitable for the muscular motion simulating system according to the present invention.

The displacement-measuring unit 57, which constitutes the load-adjusting unit, is disposed between the non-magnetic moving tube 54 and the base plate 1 for measuring the displacement of the non-magnetic moving tube 54 on the basis of the actuation of the electromagnet actuating part 55, more specifically, on the basis of the actuation of the magnetic moving tube 541. The measured value is outputted to the control unit, which will be described below.

The displacement-measuring unit 57, which serves to measure the displacement of the non-magnetic moving tube, may include a linear variable differential transformer (LVDT), a linear displacement-measuring device, or a linear potentiometer. In the embodiment of the present invention, the displacement-measuring unit 57 comprises a position measuring bar 571 contacting one of upper and lower protrusions of the non-magnetic moving tube 54, and a position measurement output part 572 for measuring the position of the position measuring bar 571 to output the displacement according to the position to the control unit.

Consequently, the load-adjusting unit moves the non-magnetic moving tube by the displacement corresponding to the increased or decreased load applied to the load cell such that it corresponds to the positional displacement of the wire with reference to the motional displacement of the non-magnetic moving tube measured by means of the displacement-measuring unit. As a result, a tension force of the spring is applied to the load cell, and thus the load of the load cell can be adjusted such that it corresponds to the muscle strength of a human body. Also, it is possible to simulate a characteristic of the muscle having large displacement by using the magnetic actuating unit having relatively small displacement to extension of the muscle through the upper and lower springs connected to the upper and lower ends of the magnetic actuating unit.

Figure 4:
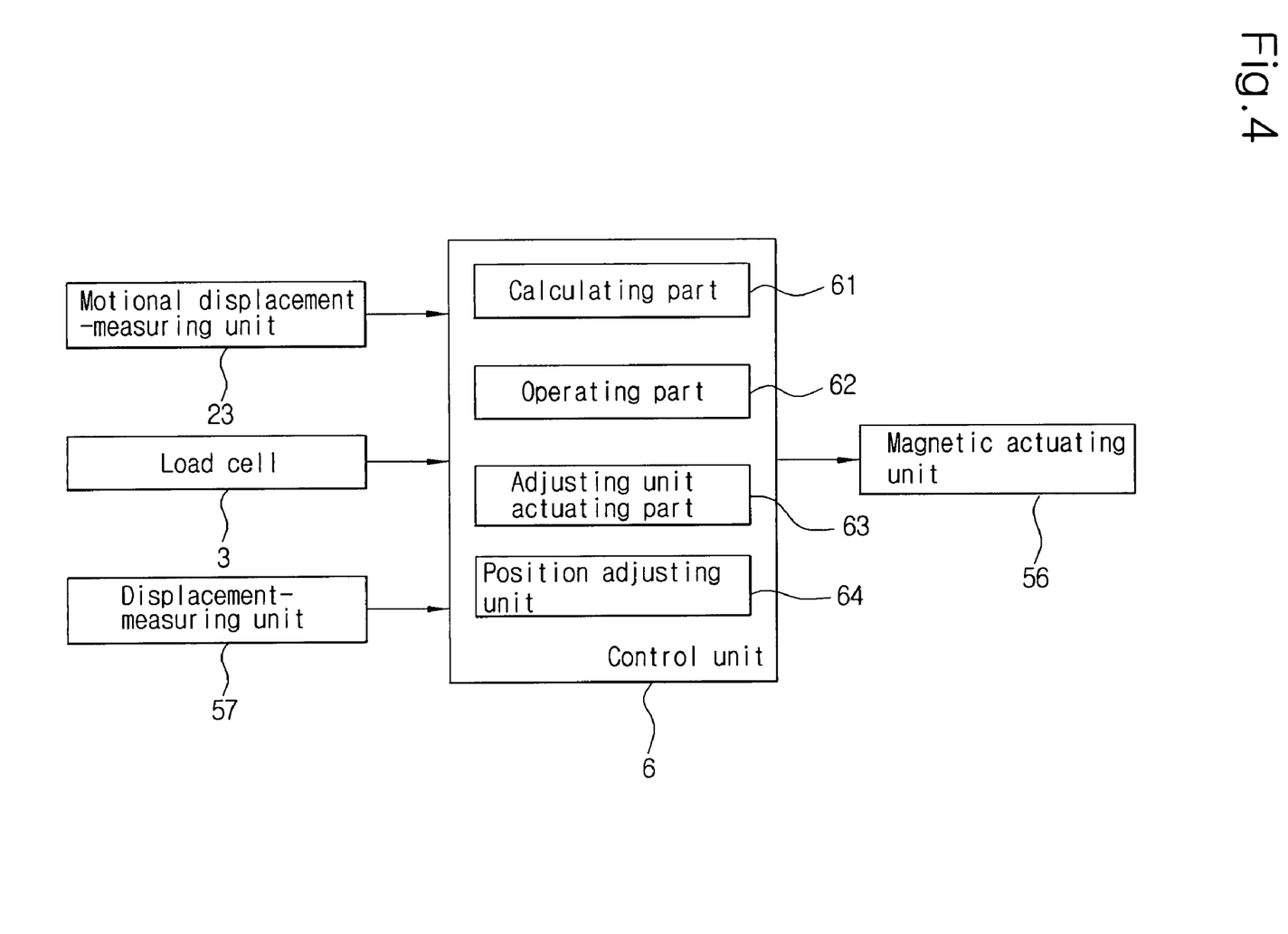
FIG. 4 is a block diagram schematically showing the structure of a control unit according to the present invention.

The control unit 6 controls the actuation of the load-adjusting unit 5 such that load applied to the load cell corresponds to the muscle strength according to the moved distance of the moving body 2 with reference to the positional information inputted from the load-adjusting unit 5. As shown in FIG. 4, the control unit 6 comprises a calculating part 61, an operating part 62, an adjusting unit actuating part 63, and a position adjusting part 64.

The calculating part 61 calculates a value of the muscle strength to the displacement through the use of the motional displacement inputted from the motional displacement-measuring unit 23 of the moving body. At this time, the moved distance of the motion table 21 (Refer to FIG. 1) inputted from the motional displacement-measuring unit 23 corresponds to the extensional displacement of the muscle of the human body. The load corresponding to a muscular condition of the human body to the displacement is calculated by using the extensional displacement.

The operating part 62 obtains a difference between the value of the muscle strength of the calculating part 61 and the load inputted from the load cell.

The adjusting unit actuating part 63 increases or decreases the load of the load cell 3 by using the resultant value of the operating part 62. Specifically, the adjusting unit actuating part 63 moves the magnetic moving tube 541 (Refer to FIG. 2b) of the magnetic actuating unit 56 such that it corresponds to the displacement equivalent to the resultant value of the operating part 62 with reference to the displacement of the non-magnetic moving tube 54 (Refer to FIG. 2b) inputted from the displacement-measuring unit 57. At this time, the movement of the magnetic moving tube is controlled by means of a PID control algorithm.

The position adjusting part 64 controls the position of the load-adjusting unit changed by means of the adjusting unit actuating part 63, more specifically the position of the magnetic moving tube, through the PID control algorithm so that the position of the magnetic moving tube can be maintained.

Operation of the muscular motion simulating system according to the present invention will hereinafter described in detail with reference to FIGS. 1, 2b, and 5.

Figure 5:
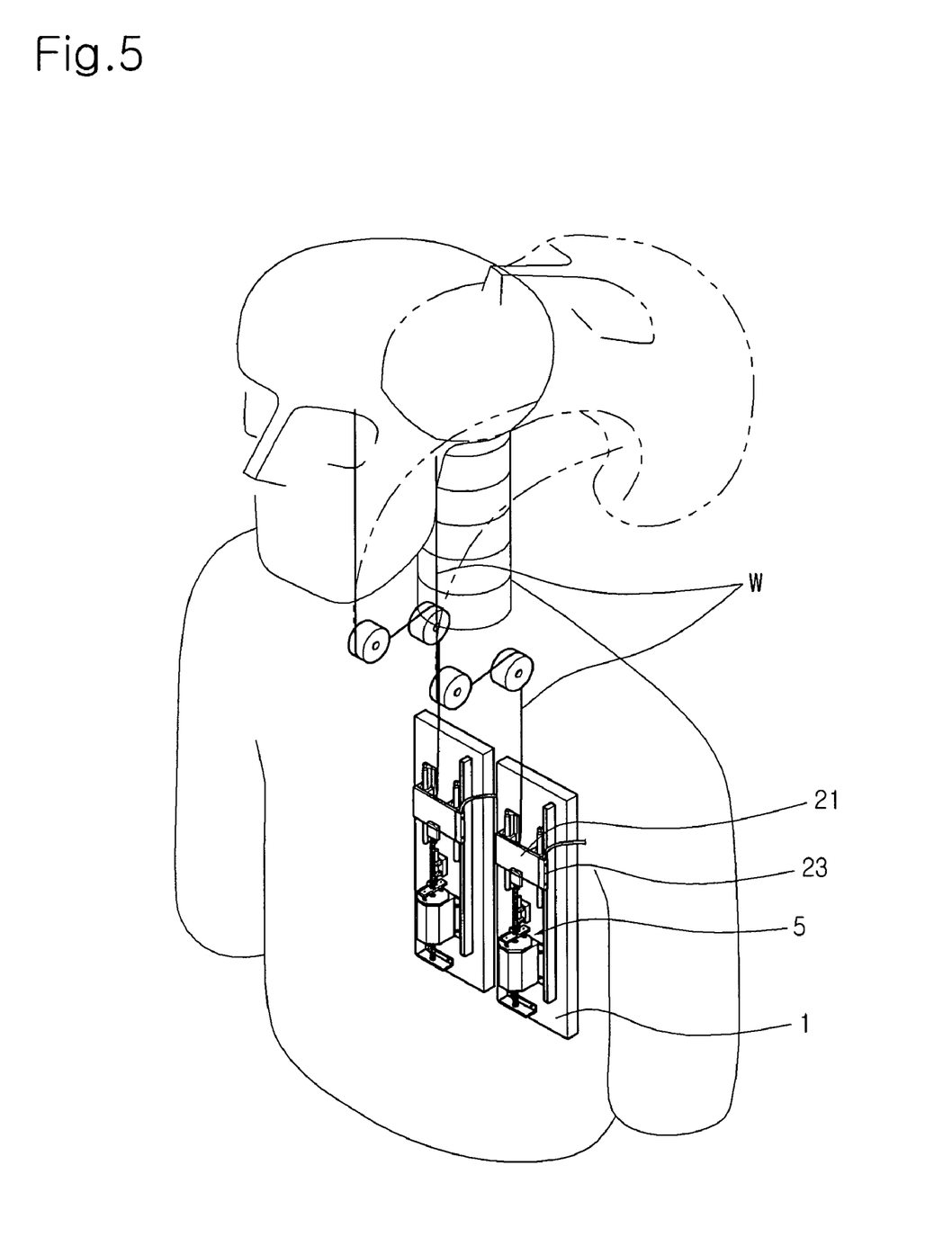
FIG. 5 is an illustrative view of a dummy with the muscular motion simulating system according to the present invention mounted therein.

FIG. 5 is an illustrative view of a dummy with the muscular motion simulating system according to the present invention mounted therein. When an impact is applied to the dummy having the muscular motion simulating system mounted therein from the rear of the dummy as shown in FIG. 5, the position of the wire W withdrawn from the virtual muscle part of the dummy is changed due to the external impact to the dummy. For example, when the neck of the dummy is pulled back by means of the external impact as shown in FIG. 5, a tension force is generated at the wire W connected to the virtual muscle part. As a result, the motion table 21 of the moving body is slid vertically on the base plate 2. The moved distance of the motion table 21 is measured by means of the motional displacement-measuring unit 23 of the moving body, and is then outputted to the control unit.

The tension force of the wire is measured by means of the load cell connected to the motion table, and is then outputted to the control unit. The load-adjusting unit, which is controlled by means of the control unit, adjusts the load of the load cell on the basis of the positional displacement of the wire such that the load of the load cell corresponds to the muscle strength of the human body.

It is assumed, for example, that the load based on the displacement is 10 N, the muscle strength of the human body corresponding to the displacement is 20 N, and the position of the non-magnetic moving tube is moved 0.5 mm toward the load cell when the moved distance of the motion table constituting the moving body is 1 mm.

In this case, the adjusting unit actuating part changes the displacement of the magnetic moving tube under the control of the control unit so that a load of 10 N is applied to the load cell. Since the current position of the non-magnetic moving tube is 0.5 mm, the adjusting unit actuating part changes the direction of the magnetic passage of the electromagnet coil so that the position of the magnetic moving tube is moved down by X mm, which is equivalent to 10 N. Consequently, the non-magnetic moving tube is moved 0.5−X mm, and thus the magnetic moving tube is moved down by means of the biased magnetic passage of the electromagnet.

In the muscular motion simulating system according to the above-described embodiment of the present invention, the magnetic moving tube is moved by 0.5−X mm so that a spring tension force of 10 N is applied to the load cell. As a result, the load of the load cell is adjusted on the basis of the positional displacement of the wire such that the load of the load cell corresponds to the muscle strength of the human body.

Consequently, the muscular motion simulating system according to the present invention can safely and accurately simulate a muscular characteristic exhibited by a Hill muscle model.

As apparent from the above description, the present invention provides a muscular motion simulating system that is capable of adjusting the load of a load cell such that the load of the load cell corresponds to the muscle strength equivalent to the extensional displacement of a virtual muscle part through a magnetic actuating unit supported by means of springs when an external impact is applied to the muscular motion simulating system. Consequently, the present invention has the effect of safely and accurately simulating a force-displacement characteristic of a Hill muscle model.

Also, the present invention has the effect of acquiring a characteristic of the muscle when a collision occurs without the limit of experimental models, such as a dummy or a cadaver. Consequently, more concrete understanding of the injury is possible.

Especially, it is possible to simulate a characteristic of the muscle having large displacement by using the magnetic actuating unit having relatively small displacement to change in length of the muscle through the springs connected to the magnetic actuating unit.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A muscular motion simulating system, comprising:
   a base plate mounted to a virtual muscle part in a dummy in the longitudinal direction thereof;
   a moving body connected to a wire withdrawn from the virtual muscle part such that the moving body can be slid on the base plate when the position of the wire is changed due to an external impact so as to output the moved distance of the moving body;
   a load cell connected to the lower part of the moving body for measuring a load depending upon the moved distance of the moving body;
   a fixing plate fixed to the lower end of the base plate while being protruded outwardly;
   a load-adjusting unit disposed between the load cell and the fixing plate for outputting positional information to increase or decrease the load applied to the load cell by means of a biasing force of the magnetic field; and
   a control unit for controlling the actuation of the load-adjusting unit such that load applied to the load cell corresponds to the muscle strength according to the moved distance of the moving body with reference to the positional information inputted from the load-adjusting unit.

2. The system as set forth in claim 1, wherein the control unit comprises:
   a calculating part for calculating a value of the muscle strength to the displacement through the use of the motional displacement inputted from the moving body;
   an operating part for obtaining difference between the value of the muscle strength of the calculating part and the load inputted from the load cell;
   an adjusting unit actuating part for increasing or decreasing the load of the load cell by using the resultant value of the operating part to move load-adjusting unit such that it corresponds to the displacement equivalent to the resultant value of the operating part with reference to the positional information; and
   a position adjusting part for controlling the position of the load-adjusting unit changed by means of the adjusting unit actuating part so that the position of the load-adjusting unit can be maintained.

3. The system as set forth in claim 2, wherein the movement of the load-adjusting unit and the position adjustment of the position adjusting part are controlled by means of a PID control algorithm.

4. The system as set forth in claim 1, wherein the load-adjusting unit comprises:
   upper and lower springs connected to the load cell and the fixing plate, respectively;
   a magnetic actuating unit including
      a non-magnetic moving tube inserted in the hollow part defined in a case fixed to the base plate such that the non-magnetic moving tube can be moved vertically in the hollow part, the non-magnetic moving tube being connected between the upper and lower springs and having a magnetic moving tube fixed to the inside thereof, and
      an electromagnet actuating part provided at the inside and the outside of the non-magnetic moving tube for applying a magnetic field-biasing force to the magnetic moving tube so that the position of the non-magnetic moving tube is changed; and
   a displacement-measuring unit disposed between the non-magnetic moving tube and the base plate for measuring the displacement of the non-magnetic moving tube on the basis of the actuation of the electromagnet actuating part and for outputting the measured displacement to the control unit.

5. The system as set forth in claim 4, wherein the electromagnet actuating part comprises:
   two permanent magnets disposed inside the magnetic moving tube and surrounded by a non-magnetic film tube while the permanent magnets are spaced apart from each other due to repulsive forces between the permanent magnets, and
   an electromagnet coil disposed outside the non-magnetic moving tube for applying a magnetic field-biasing force to the magnetic moving tube through the control of magnetic passages of the permanent magnets.

6. The system as set forth in claim 4,
   wherein the magnetic moving tube is provided at the inner surface thereof with semi-circular grooves, the semi-circular grooves being filled with a lubricant to guide a horizontal movement of the magnetic moving tube, and
   wherein the outer surface of the non-magnetic film tube is hardened.

7. The system as set forth in claim 4, wherein the displacement-measuring unit comprises:
   a position measuring bar contacting one of upper and lower protrusions of the non-magnetic moving tube; and
   a position measurement output part for detecting the position of the position measuring bar to output the displacement according to the position to the control unit.

8. The system as set forth in claim 1, wherein the moving body comprises:
   a motion table connected to the end of the wire and slidable by means of a guide unit fixed to both sides of the upper part of the base plate when the position of the wire is changed; and
   a motional displacement-measuring unit fixed to one side of the motion table for measuring the moved displacement of the motion table and outputting the measured displacement to the control unit.

9. The system as set forth in claim 8, wherein the guide unit comprises:
   guide shafts fixed to both sides of the base plate while extending in the longitudinal direction of the base plate, respectively; and
   guide grooves formed at both sides of the rear part of the motion table such that the guide shafts are slidably inserted in the guide grooves, respectively.

* * * * *